Figure 1:
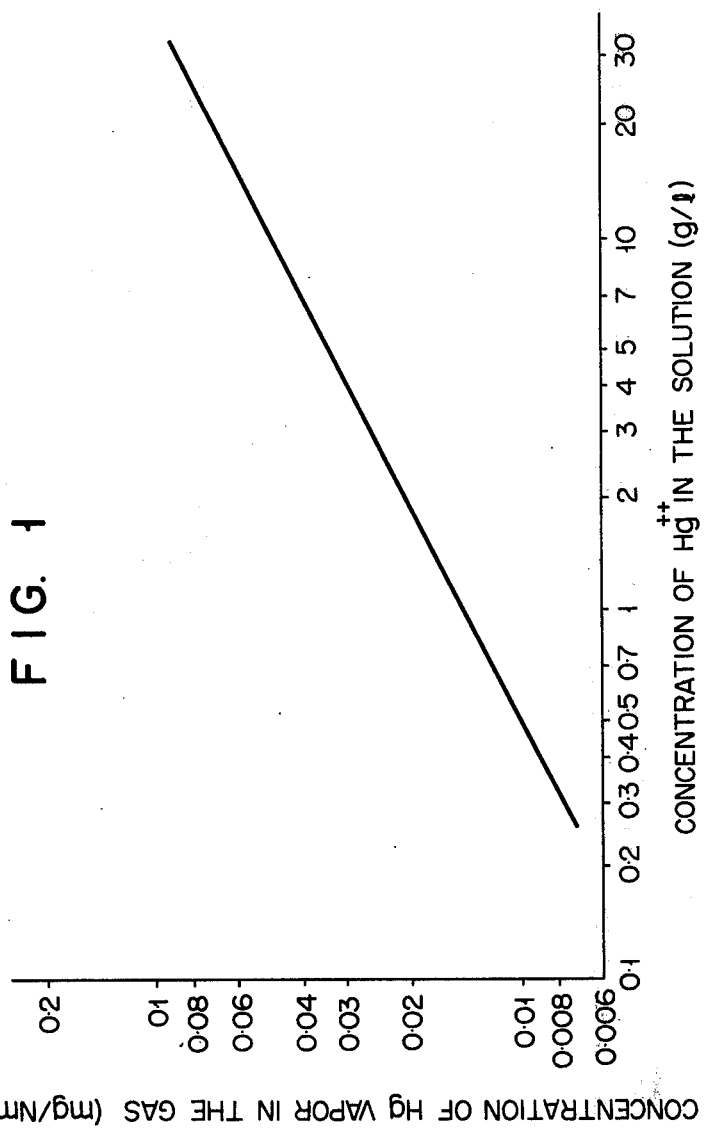

United States Patent [19]

Kawase et al.

[11] 4,009,241

[45] Feb. 22, 1977

[54] METHOD OF REMOVING MERCURY VAPOR FROM GASES CONTAMINATED THEREWITH

[75] Inventors: Buntaro Kawase, Tokyo; Iwao Kojima, Yokohama; Juichi Kasai, Fujisawa; Keiji Kawasaki, Tokyo, all of Japan

[73] Assignee: Showa Denko Kabushiki Kaisha, Tokyo, Japan

[22] Filed: Oct. 11, 1974

[21] Appl. No.: 513,948

Related U.S. Application Data

[63] Continuation-in-part of Ser. No. 288,386, Sept. 12, 1972, abandoned.

[30] Foreign Application Priority Data

Sept. 16, 1971 Japan .............................. 46-71211
Apr. 8, 1972 Japan .............................. 47-34855

[52] U.S. Cl. ................................. 423/210; 75/121
[51] Int. Cl.² ...................................... B01D 47/00
[58] Field of Search .......... 423/101, 106, 210, 215; 75/121; 204/99

[56] References Cited

UNITED STATES PATENTS

| | | | |
|---|---|---|---|
| 2,289,966 | 7/1942 | Herstein | 423/106 |
| 3,677,696 | 7/1972 | Bryk et al. | 423/106 |
| 3,685,960 | 8/1972 | Benson | 423/229 |
| 3,725,530 | 4/1973 | Kawase et al. | 423/210 |
| 3,838,190 | 9/1974 | Birke | 423/210 |
| 3,849,537 | 11/1974 | Allgulin | 423/210 |

OTHER PUBLICATIONS

Cotton & Wilkonson, "Advanced Inorganic Chemistry." Interscience Publishers, N.Y., N.Y., 1966, p. 613.

*Primary Examiner*—Oscar R. Vertiz
*Assistant Examiner*—Wayne A. Langel
*Attorney, Agent, or Firm*—Carroll F. Palmer

[57] ABSTRACT

A method of removing mercury vapor from a gas contaminated therewith comprising washing said gas with an acid solution of divalent mercury ions, the concentration of which ranges from 0.5 to 100g per liter, at room temperature and atmospheric pressure; and rewashing the resultant gas with an acid solution of divalent mercury ions, the concentration of which ranges from 0.05 to 0.5g per liter, at room temperature and atmospheric pressure to obtain a purified gas containing mercury vapor of less than 0.01 mg/Nm³, that is, 0.001 ppm.

6 Claims, 2 Drawing Figures

METHOD OF REMOVING MERCURY VAPOR FROM GASES CONTAMINATED THEREWITH

CROSS REFERENCE TO RELATED APPLICATION

This application is a continuation-in-part of our copending Patent Application Ser. No. 288,386 filed Sept. 12, 1972 and now abandoned, and assigned to the same assignee as the present application.

This invention relates to a method of removing mercury vapor from gases contaiminated therewith, and more particularly to a method of removing mercury vapor from byproduct hydrogen evolved from mercury electrolytic cells producing caustic soda. Further, the method of the present invention has been accomplished by improving a similar method set forth in U.S. Patent Application Ser. No. 107,576 filed Jan. 18, 1971 and assigned to the same assignee as the instant application, now U.S. Pat. No. 3,725,530.

In the afore-mentioned prior method, the mercury vapor contaminated gas was purified by washing it with an acid solution concentrated to 10 to 30 weight % and containing from 0.5 to 1.5 weight % of persulfate ions based on the total weight of said acid solution. Said mercury was oxidized by the persulfate ions contained in the acid solution to form a slightly soluble mercury oxide, thereby reducing the mercury content in the washed gas to less than 0.01 mg/Nm³. This reaction was supposed to proceed through the processes indicated by the following chemical equations:

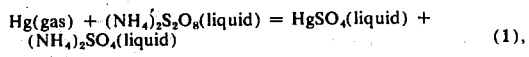

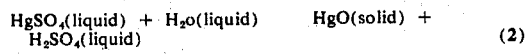

Accordingly, the higher the acidity of the solution, the less the precipitation of HgO.

The gas washing of the prior method could be continued by drawing off part of a circulating acid solution containing some amounts of dissolved mercury oxide and the precipitate thereof, and replacing the spent solution with a fresh acid solution containing persulfate ions. In that case, the metallic mercury could be recovered from the drawn off acid solution by reducing the mercury oxide contained therein using a proper reducing agent such as sulfur dioxide or hydroquinone. After this recovery, the residual acid solution was fed back to the circulating system by dissolving additional persulfate therein. As mentioned in the aforesaid U.S. Pat. No. 3,725,530, the present inventors found as the result of many experiments the fact that, even if the persulfate ions were in contact with hydrogen gas in an acid solution, the persulfate, except a part thereof consumed to the oxidation of the mercury vapor in the hydrogen gas, was extremely slow in the decomposition rate, and that the absorption rate of the mercury vapor scarcely lowered till no persulfate ion remained in the solution even after many hours of the gas flow. Sometime later, the present inventors found a curious fact that removal of the mercury vapor was attained even when the acid solution did not contain any persulfate ion after many hours of the gas flow.

Since this event seemed difficult to understand, the present inventors later conducted studies to find the underlying principle. As the result, it has been found that all mercury vapor is not directly oxidized by the persulfate ions, but that a slightly soluble monovalent mercury salt is formed in the acid solution from part of the mercury vapor. Said monovalent ions are oxidized as an interim step by the persulfate ions contained in the acid solution to be converted to very soluble divalent mercury salts. As long as the solution contains said divalent mercury ions as an interim oxidizing agent, contact of the mercury vapor with said divalent mercury ions results in the formation of slightly soluble monovalent mercury salts in the acid solution. The removal of the mercury vapor from the gas takes place along with the formation of said slightly soluble monovalent mercury salts. This side reaction may be exemplified by the following equations:

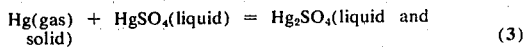

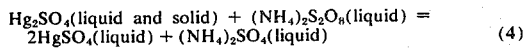

The aforesaid equation (1) is obtained by joining the equations (3) and (4).

Afterwards, it was discovered with respect to the prior method that where there were partly formed precipitates of red or yellow mercury oxide in the spent acid solution through the process of the equation (2), said mercury oxide contained small amounts of white precipitates of monovalent mercury sulfate. The present invention has been accomplished by the original idea based on this discovery that even when the acid solution does not contain any persulfate ion, the mercury vapor in the gas can be removed by divalent mercury ions if they are made to be present in said solution in place of said persulfate.

Accordingly, the method of the present invention is characterized by washing a mercury vapor-contaiminated gas with an acid solution which does not contain persuffate ions but divalent mercury ions. As detailed later, it is an important condition to maintain the concentration of divalent mercury ions in the acidic washing solution in the range of from 0.05 to 0.5g per liter in order to reduce the mercury vapor content of the outlet gas to less than 0.01 mg/Nm³, that is, 0.001 ppm.

Other important objects and advantageous features of the invention will be apparent from the following description and accompanying drawings, wherein, for present purposes of illustration only, a specific embodiment of the invention is set forth in detail.

Figure 2:
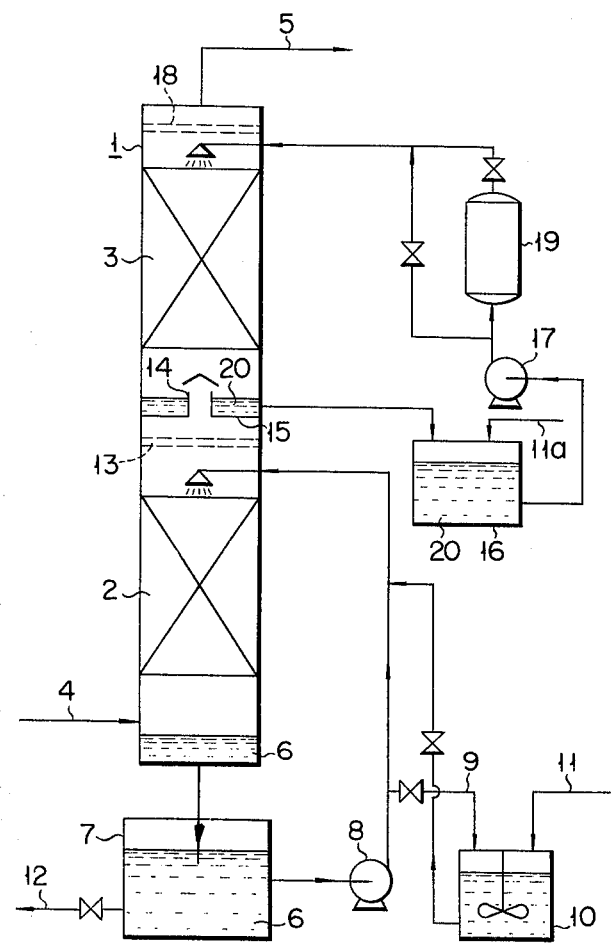

In the drawings:

FIG. 1 shows a graph of the concentration of mercury vapor in the outlet gas relative to the concentration of divalent mercury ions in a sulfuric acid solution; and FIG. 2 is a schematic flow sheet illustrating a process according to the present invention for removing mercury vapor from gases contaminated therewith.

In general, divalent mercury salts have a far less oxidizing power than ordinary oxidizing agents such as persulfates, permanganates, bichromates or chlorates, and consequently have heretofore attracted no attention as an oxidizing agent. However, the present inventors have found the fact, that as far as the purification of mercury vapor-contaminated gases is concerned, the divalent mercury ions display a prominent effect of oxidizing mercury vapor and that the mercury vapor changes to monovalent mercury ions by the action of the divalent mercury ions as an oxidizing agent. Further when used as an oxidizing agent, the divalent mercury ions do not give rise to the evolution of oxygen gas or other harmful decomposition products, thus presenting great stability. Ammonium persulfate $(NH_4)_2S_2O_8$ is usually unstable in its aqueous solution and liable to generate oxygen gas. Accordingly, the mercury vapor removing method of the present invention using said divalent mercury ions is well adapted particularly for manufacture of pure hydrogen.

According to the method of the present invention, the divalent mercury ions are prepared by drawing off from a circulating system an acid washing solution containing a monovalent mercury salt formed therein in accordance with the aforementioned equation (3), and oxidizing the monovalent mercury ions included in said drawn off solution into divalent mercury ions using ordinary oxidizing agent, such as persulfates, permanganates, bichromates or chlorates, in an amount slightly smaller than the stoichiometric proportion thereof. The solution containing divalent mercury ions is fed back to the original acid solution for removing mercury vapor so as to be used by circulation. However, it is most preferred to use ammonium persulfate as an oxidizing agent in order to suppress the secondary contamination of the purified gas and spent washing solution due to heavy metal atoms or chlorine gas being introduced thereinto. Even if oxygen gas generates by the decomposition of said ammonium persulfate in the storage tanks 10 and 16, it does not enter into the washing tower, being prevented from the contamination of purified gas. Further, other portions of the circulating acid solution are drawn off at times. There is introduced a reducing gas such as sulfur dioxide into the drawn off portions, thereby removing metallic mercury with a yield of substantially 100 percent by the customary process.

As the result of original study and repeated research works, the inventors have found for the first time that divalent mercury ions in the washing acid solution should have concentrations ranging from 0.05 to 0.5g per liter in order to reduce the mercury content of the outlet gas to less than 0.01 mg/Nm³. If the concentration of said divalent mercury ions falls to below 0.05 per liter, the oxidation reaction will slow down to render the washing operation extremely inefficient. Conversely, if said concentration rises above 0.5g per liter, then there will be presented considerable difficulties in maintaining the concentration of mercury vapor in the cleaned gas at less than 0.01 mg/Nm³. The reason is that if divalent mercury ions in the washing solution have larger concentrations, then mercury vapor brought into contact therewith will also be more concentrated than the above due to the mercury vapor generated by the decomposition of fine mercury sulfate deposited on the gas outlet inner wall of the washing tower.

The deposit is formed in such a manner mentioned below. Part of the washing solution containing mono- and di-valent mercury sulfates accompanied with the outlet gas as a fine mist adheres onto the gas outlet inner wall of the washing tower. Almost all of the divalent mercury sulfate is carried back to the circulating solution in the tower because of its high solubility, whereas part of monovalent mercury sulfate remains on said inner wall as a solid state by being dried while the outlet gas passes over there on account of its low solubility. The decomposition is represented by the following equation.

$$Hg_2SO_4 = Hg + HgSO_4$$

The amount of above-mentioned deposit is very few, and negligible in a conventional scrubbing process. However, in the present case, the small amount of mercury vapor derived from the above-mentioned deposit can not be ignored in order to maintain the mercury vapor content in the outlet gas to be less than 0.01 mg/Nm³.

The inventors investigated the relationship between the concentration of divalent mercury ions in the washing solution and the equilibrium concentration of mercury vapor in the outlet gas of the washing tower. As a result of this investigation and many experiments, the inventors obtained the relation chart shown in FIG. 1 for the first time. As apparent from FIG. 1, divalent mercury ions in the washing solution at the final stage of mercury washing should have a concentration of less than 0.5g per liter in order to maintain the mercury vapor content in the outlet gas less than 0.01 mg/Nm³.

When, however, there are to be washed large amounts of byproduct hydrogen gas evolved from mercury electrolytic cells with a mercury vapor content of about 40 mg/Nm³ in order to maintain the mercury content in the cleaned gas at less than 0.01 mg/Nm³, then application from the start of a circulating washing agent consisting of an acid solution containing less than 0.5g per liter of divalent mercury ions would be extemely uneconomical because it would be necessary to provide a large scale washing tower and treat considerable amounts of a circulating washing solution. To attain an economic and effective washing process, therefore, the method of this invention consists in providing a washing tower consisting of two or three vertically arranged washing zones in a tower, passing mercury vapor-contaminated gas successively through all the washing zones, and also circulating acid solutions containing different concentrations of divalent mercury ions in the separate washing zones, namely, the solution having the low concentration of less than 0.5g per liter through the top washing zone and the solution containing high concentration through the next lower washing zone and so on. This arrangement renders an entire washing tower compact and enables the mercury vapor content in the outlet gas to be reduced to less than 0.01 mg/Nm³.

FIG. 2 is a schematic flow sheet where a washing tower consists of two vertically arranged washing zones according to an embodiment of this invention. The washing tower 1 includes a primary washing zone 2 and a secondary washing zone 3. A raw gas containing mercury vapor enters the tower 1 through a gas inlet 4 at the bottom part of the primary washing zone 2. A purified gas is drawn out of the tower through a gas outlet 5 at the tower top to be later put to suitable uses. An acid washing solution 6 containing divalent mercury ions at a concentration of 0.5 to 100g per liter is made to circulate between a storage tank 7 and the primary washing zone 2 by a pump 8. Part of the circulating solution is conducted from a branch pipe 9 to an oxidizing vessel 10, which is supplied with a solution of an oxidizing agent from an inlet pipe 11 in an amount slightly smaller than the stoichiometric proportion thereof. After converting almost all of monovalent mercury ions into divalent mercury ions in said oxidizing vessel 10, the acid solution substantially consisting of divalent mercury ions devoid of any of the oxidizing agent introduced through pipe 11 is brought back to the circulating system. Since increasing amounts of the circulating solution are collected in the storage tank 7, part of the solution is drawn off through a liquid outlet 12 as required, and the drawn off solution is sent to a metallic mercury recovery plant (not shown). In the primary washing zone 2, divalent mercury ions having concentrations of, for example, 10 to 30g per liter, reduce the mercury vapor content of a raw gas ranging from 30 to 40 mg/Nm$^3$ almost to 0.05 to 0.10 mg/Nm$^3$ (cf. FIG. 1).

The raw gas passing through the primary zone 2 is further conducted through a mist separator 13 and then a riser-tube 14 of a tower tray 15 into the secondary washing zone 3 and, after being subjected to final washing, is drawn off through a gas outlet 5. A washing solution 20 containing divalent mercury ions at concentrations of from 0.05 to 0.5g per liter which has been collected in the tower tray 15 is temporarily drawn out and stored in another storage tank 16, and further carried from there to the secondary washing zone 3 by another pump 17. The raw gas which has passed through said secondary washing zone 3 is conducted through another mist separator 18, and drawn out of the circulating system through the gas outlet 5. At this time, the mercury vapor content in the purified gas is reduced to less than 0.01 mg/Nm$^3$ (cf. FIG. 1). Numeral 11a denotes an inlet pipe for adding a solution of an oxidizing agent in the same manner as the inlet pipe 11.

The mercury vapor contained in the gas leaving the primary zone and the mercury ions in the washing solution circulating through the secondary washing zone have extremely low concentration. Accordingly, a monovalent mercury salt formed by the oxidizing action of divalent mercury ions remains in a fully dissolved state in the second circulating solution, giving rise to no precipitation. The required afore-mentioned amount of oxidizing agent solution necessary for the oxidation of monovalent mercury ions is supplied through the inlet pipe 11a to the storage tank 16, so that, in the secondary circulation system, it is unnecessary to draw off part of excess amounts of the washing solution and conduct it to a metallic mercury recovering plant as is the case with the primary circulating system. Said excess solution, which is devoid of any oxidizing agent introduced through pipe 11a, may be allowed naturally to run down the riser-tube 14 into the primary washing zone 2. Further, a preferred way to prevent the mercury ions from being increasingly introduced into the second circulating washing system is to provide an adsorber 19 filled with an adsorbent, for example, a chelate resin, in a bypath to the second circulation system, and conduct part of the solution through the adsorber to remove the mercury ions contained therein. The mercury vapor removing apparatus which is designed to treat, for example, 1000 Nm$^3$ per hour of raw gas, having the above-mentioned adsorber 19, only consumes about 10 Kg per year of the chelate resin.

There is no need for the washing solutions circulating through each of the washing zones 2 and 3 to have a fixed concentration respectively. Instead, said solutions may be allowed to increase gradually in concentration as washing proceeds, and said concentrations have only to be properly controlled as often as required. That is to say, it is not always necessary to add the required amount of oxidizing agent continuously to the storage tanks in order to regenerate the divalent ions during consuming the washing.

The washing solution used in the method of the present invention may include various kinds of acid, for example, sulfuric acid, hydrochloric acid or nitric acid. However, it is most preferred to choose sulfuric acid as a stable constituent which can prevent any gaseous decomposition product from being introduced into purified gas. The reason is that application of hydrochloric acid is likely to cause hydrogen chloride gas to be mixed with the purified gas and application of nitric acid possibly results in the intrusion of nitrogen oxide into the purified gas.

While the optimum concentration of an acid in the washing solution, of course, varies with the kind of acid used, the concentration of sulfuric acid may broadly range from 1 to 30 percent by weight. The degree of said concentration does not affect the rate of oxidizing mercury vapor. Where, however, there is used hydrochloric acid or nitric acid, its concentration should be defined within the range of from 0.1N to 1.0N in consideration of the possible evolution of the aforesaid gaseous decomposition product which is likely to contaminate the purified gas.

The foregoing description refers to the case where the mercury vapor content of the purified gas is to be reduced to less than 0.01 mg/Nm$^3$. However, the method of the present invention is applicable even where there is no need to decrease the content of mercury vapor to such extent. In this case, the concentration of divalent mercury ions in the acid washing solution may be suitably chosen to range between 0.5 and 150g per liter. When a known method, such as low temperature processing adsorptional processing, washing with chlorine water or washing with acidic permanganate solution described in the specification of U.S. Pat. No. 3,725,530, was used where it was not required to reduce the content of mercury vapor to less than 0.01 mg/Nm$^3$, it was impossible to avoid the secondary contamination of the purified gas due to heavy metal atoms or harmful gases being carried thereinto. The method of U.S. Pat. No. 3,725,530 itself has a chance of secondary contamination of the purified gas by oxygen due to the decomposition of persulfate ions. In contrast, the method of the present invention is characterized by freedom from any such occurrence. This originates with a novel process of oxidizing mercury vapor by divalent mercury ions for its removal.

The foregoing description chiefly refers to the elimination of mercury vapor from hydrogen gas evolved from mercury electrolytic cells. However, the method of the present invention is not limited to such application alone, but may be used as well in the case of purifying other gases, for instance, where it is desired to clean exhaust from mercury mines of its mercury content or purify the indoor atmosphere of a mercury thermometer manufacturing plant which is supposed to be contaminated with mercury vapor.

The method of the present invention may be more fully understood by reference to the following experiments and examples.

EXPERIMENT 1

Hydrogen gas drawn off from a hydrogen cylinder was conducted through a mercury vapor saturator and a water vapor saturator, each of which was maintained at 45° C, into the bottom part of a gas absorber, 50 mm in diameter and 1000 mm high, filled with 1l of an absorbing solution consisting of 7.4g of divalent mercury sulfate, 225g of sulfuric acid and 900g of water. When the above-mentioned hydrogen gas which contained about 40 mg/Nm$^3$ of mercury vapor was passed through the absorber at the rate of 200l per hour, then the mercury content of the gas discharged at the top of said absorber was reduced to 0.03 mg/Nm$^3$. At this time, divalent mercury ions in the solution had a concentration of about 5.0g per liter, the mercury vapor content of the hydrogen gas thus washed substantially corresponded to the value obtained from the graph of FIG. 1.

EXPERIMENT 2

There was used the same type of absorber as in Experiment 1. The absorber was filled with 1 of a solution prepared by dissolving 20g of divalent mercury chloride in hydrochloric acid at a concentration of 0.4N. As in Experiment 1, hydrogen gas containing mercury vapor was passed through the absorber at the rate of 200l per hour. The mercury content of the outlet gas was 0.06 mg/Nm$^3$.

EXPERIMENT 3

There was added 1.3g of ammonium persulfate to a solution consisting of 0.6g of monovalent mercury sulfate, 230g of sulfuric acid and 900g of water. When the mixed solution was analysed 24 hours later, the monovalent mercury ions were found to have been fully oxidized to divalent mercury ions, which had a concentration of 0.48g per liter. The solution was boiled to hydrolyse ammonium persulfate remained therein, and then the removing of mercury vapor was conducted in the same manner as in Experiment 1. The mercury content of the outlet hydrogen gas was prominently reduced to less than 0.01 mg/Nm$^3$, which well agreed with a value obtained from the graph of FIG. 1.

EXPERIMENT 4

Air delivered from an air compressor was passed through a mercury vapor saturator and a water vapor saturator maintaining about 40 mg/Nm$^3$ of mercury vapor was introduced at the rate of 250l per hour into the bottom of the same type of absorber as in Experiment 1 filled with 1l of an absorbing solution consisting of 4.5g of divalent mercury sulfate, 225 g of sulfuric acid and 900g of water, and circulated through said absorber. The gas discharged through an outlet at the top of the absorber only contained 0.03 mg/Nm$^3$ of mercury vapor. At this time, divalent mercury ions in the absorbing solution had a concentration of about 3.0g per liter, said mercury vapor content showing good accord with a value obtained from the graph of FIG. 1.

EXAMPLE

There was used a washing tower 200 mm in inner diameter consisting of, as shown in FIG. 2, primary and secondary washing zones each 1000 mm high filled with porcelain Raschig rings of 15 mm size. A byproduct hydrogen gas evolved from mercury electrolytic cells producing caustic soda, which contained about 40 mg/Nm$^3$ of mercury vapor, was introduced into the primary washing zone from its bottom at the rate of 70 m$^3$ per hour at room temperature and atmospheric pressure. Through the primary washing zone was circulated at the rate of 2 m$^3$ per hour a solution containing 10g of divalent mercury ions per liter of sulfuric acid at a concentration of 30 percent by weight. The concentration of mercury vapor in the hydrogen gas delivered from the primary washing zone was 0.05 mg/Nm$^3$. Through the secondary washing zone was circulated at the rate of 2 m$^3$ per hour a solution containing 0.4g of divalent mercury ions per liter of sulfuric acid at a concentration of 30 percent by weight. The hydrogen gas from the primary washing zone was conducted through the secondary zone. Purified hydrogen gas discharged through the outlet at the tower top contained less than 0.01 mg/Nm$^3$ of mercury vapor.

What we claim is:
1. A method of reducing the content of mercury vapor from a gas contaminated therewith to less than 0.01 mg/Nm$^3$ for purification of the gas comprising the steps of:
   1. washing the contaminated gas in a lower gas-liquid contact zone of a two stage vertical washing tower with a circulating solution, which is acidified by sulfuric acid, containing therein divalent mercury ions with a concentration of from about 0.5 to 100 grams per liter, whereby the greater part of the mercury vapor in the gas contaminated therewith is taken out into the circulating solution in a form of monovalent mercury ions, obtaining a partly purified gas stream;
   2. washing the partly purified gas stream obtained by step (1) in an upper gas-liquid contact zone of said two stage vertical washing tower with another circulating solution, which is acidified by sulfuric acid, containing therein divalent mercury ions with a concentration of from about 0.05 to 0.5 gram per liter, whereby the remnant part of the mercury vapor in the gas contaminated therewith is substantially taken out into the circulating solution in a form of monovalent mercury ions, obtaining a purified gas stream;
   3. drawing off a portion of the circulating solution in step (1) in order to change almost all of monovalent mercury ions using a smaller amount of an oxidizing agent than the stoichiometric proportion therefor, and feeding the thus treated solution which is free of said oxidizing agent back to the circulating solution of step (1) accompanied with a replenishing fresh solution;
   4. drawing off another portion of the circulating solution in step (1) in order to recover metallic mercury from the monovalent and divalent mercury ions contained therein by means of reduction; and
   5. replenishing a fresh solution into the circulating solution of step (2), while any excess portion of said circulating solution is caused to flow down into the gas-liquid contact zone of step (1).

2. A method according to claim 1, wherein the concentration of sulfuric acid in the both circulating solutions ranges between 1 to 30 percent by weight on the basis of the weight of both circulating solutions respectively.

3. A method according to claim 2, wherein the oxidizing agent to be added to both drawn off solutions is ammonium persulfate.

4. A method according to claim 1, wherein the contaminated gas is a byproduct hydrogen gas evolved from mercury electrolytic cells producing caustic soda.

5. A method according to claim 1, wherein the contaminated gas is exhaust from mercury mines.

6. A method according to claim 1, wherein the contaminated gas is the indoor atmosphere of a mercury thermometer manufacturing factory.

* * * * *